Aug. 22, 1933.                C. W. VAN RANST                1,923,342
                           AUTOMOBILE CONSTRUCTION
                              Filed May 31, 1929
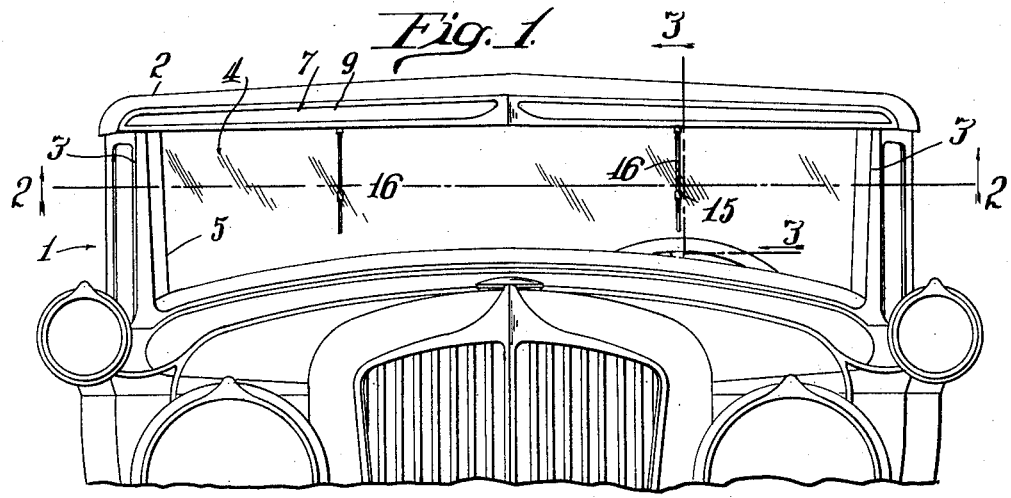
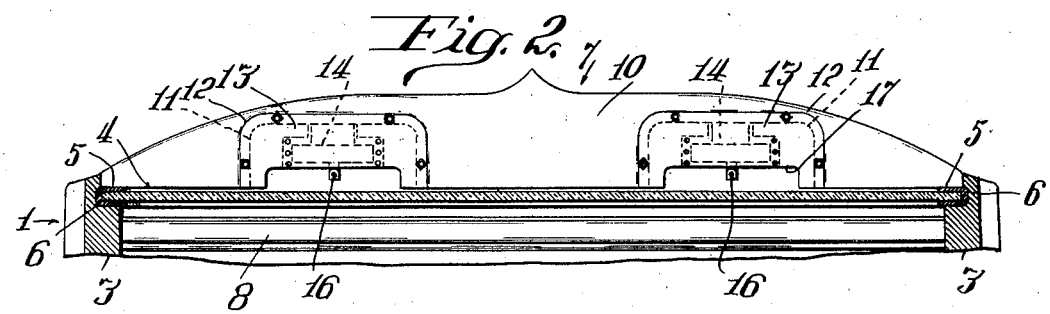
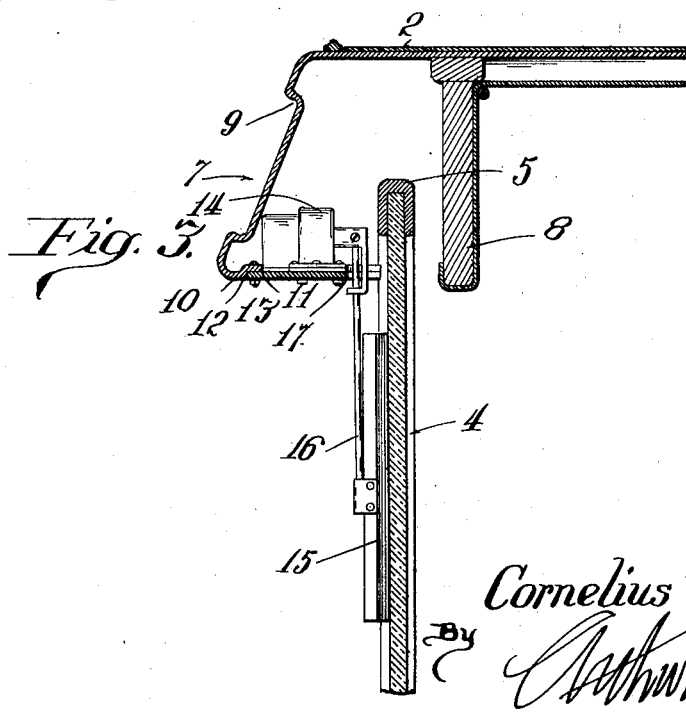
Inventor
Cornelius W. Van Ranst
By
Attorney Patented Aug. 22, 1933

1,923,342

UNITED STATES PATENT OFFICE 1,923,342

AUTOMOBILE CONSTRUCTION

Cornelius W. Van Ranst, Auburn, Ind., assignor, by mesne assignments, to Manning & Co., Chicago, Ill., a Corporation of Illinois Application May 31, 1929. Serial No. 367,410

1 Claim. (Cl. 296—84)

This invention relates to improvements in automobile constructions and it consists of the matters hereinafter described and more particularly pointed out in the appended claim.

Power actuated windshield wipers are considered part of the standard equipment on substantially all passenger automobiles now made. Such wipers include a motor and a wiper arm or blade and the motor is usually exposed to view due to the mounting thereof on the windshield. In the more finely appointed automobiles, this condition is objectionable as it detracts from the furnishings thereof.

The primary object of the invention is to provide such an arrangement of parts, that the wiper motor is concealed from view but is so arranged as to be easily accessible for inspection, adjustment and repairs when any one thereof becomes necessary.

Another object of the invention is to so construct the automobile as to provide a hollow, enclosed visor therefor in which the wiper motor is located with the wiper blade engaged with the glass of the windshield.

Still another object of the invention is to so form the visor thereof that it will house the wiper motor, which is mounted on a plate removably secured to the bottom wall of the visor.

These objects of the invention as well as others, together with the many advantages thereof, will more fully appear as I proceed with my specification.

In the drawing:

Fig. 1 is a view in front elevation of the windshield and adjacent parts of an automobile embodying my improved construction.

Fig. 2 is a horizontal sectional view as taken on the line 2—2 of Fig. 1.

Fig. 3 is a detail vertical sectional view through a portion of the windshield and visor on an enlarged scale as taken on the line 3—3 of Fig. 1.

Referring now in detail to that embodiment of the invention illustrated in the accompanying drawing, 1 indicates as a whole the closed body of an automobile which includes a top 2 and upright front corner posts 3—3 therefor. 4 indicates as a whole the windshield glass bound at its top and side margins by suitable framing 5. The windshield is engaged at its side margins in grooves 6—6 in the corner posts whereby the windshield may be raised and lowered by suitable mechanism (not shown) to close and open the same.

7 indicates as a whole the visor forming a continuation of the top and projecting forwardly of the windshield and depending from the top 2 to the rear of the windshield in a drop 8 which closes off the interior of the visor from the view of the persons in the body 1 of the automobile.

The visor which is hollow includes a front wall 9 of desired outline and a horizontal bottom wall 10. In said bottom wall, substantially in alignment with the positions occupied by persons on the front seat of the automobile, are formed openings 11 each defined on three sides by an upwardly embossed flange 12 and opening at its fourth side through the rear edge of said bottom wall. Associated with each opening is a plate 13 that is removably secured against the flange 12 so that its bottom face is flush with the bottom face of the wall 10.

Mounted on the top surface of each plate is a motor 14 of any suitable kind for actuating a wiper blade 15. Said motor, as shown herein, is of the pneumatic type, and includes a swinging arm 16 positioned in a notch 17 in the rear edge of the plate and operatively connected to the blade. The necessary tubing or conduit for supplying motive fluid thereto may be disposed within the visor and then pass down one of the corner posts so as to be engaged as with a vacuum device on the automobile.

Should the motor need adjustment, the plate 13 is removed from the bottom wall of the visor so that the motor is easy for access. After adjusting the motor, the plate is easily replaced.

The construction described permits concealing the motor from view so that persons riding in the automobile are not aware of its existence. The drop board effectively curtains off the interior of the visor.

While in describing my invention, I have referred in detail to the form, arrangement, and construction of the several parts thereof, the same is to be considered merely as illustrative so that I do not wish to be limited thereto except as may be pointed out in the appended claim.

I claim as my invention:

An automobile embodying therein a top, a hollow visor including a bottom wall arranged at the front end of the top, a member spaced rearwardly from the visor and depending from the top and a windshield having a portion normally arranged in the space between said visor and said member respectively, said bottom wall of the visor being adapted to support a wiper blade actuator located within said visor and concealed from view by said member.

CORNELIUS W. VAN RANST.